(12) United States Patent
Metcalfe et al.

(10) Patent No.: US 7,525,114 B2
(45) Date of Patent: Apr. 28, 2009

(54) MULTIPLE AXIS MULTIPOINT NON-CONTACT MEASUREMENT SYSTEM

(75) Inventors: Leonard Metcalfe, Surrey (CA); Terry Arden, Burnaby (CA)

(73) Assignee: LMI Technologies Ltd., Dublin (IE)

( * ) Notice: Subject to any disclaimer, the term of this patent is extended or adjusted under 35 U.S.C. 154(b) by 0 days.

(21) Appl. No.: 11/687,506

(22) Filed: Mar. 16, 2007

(65) Prior Publication Data

US 2007/0210240 A1    Sep. 13, 2007

Related U.S. Application Data

(63) Continuation-in-part of application No. 11/364,488, filed on Feb. 27, 2006, now Pat. No. 7,420,196.

(30) Foreign Application Priority Data

Feb. 14, 2006    (CA) ................................. 2536411

(51) Int. Cl.
*G01N 21/86*    (2006.01)
*G01V 8/00*    (2006.01)

(52) U.S. Cl. ............................ 250/559.31; 250/206.1; 356/602

(58) Field of Classification Search ............ 250/206.1, 250/559.29, 559.31, 559.38; 356/3.1, 3.12, 356/602

See application file for complete search history.

(56) References Cited

U.S. PATENT DOCUMENTS

| | | | |
|---|---|---|---|
| 4,687,325 A | 8/1987 | Corby et al. | |
| 4,937,445 A | 6/1990 | Leong et al. | |
| 5,056,922 A | 10/1991 | Cielo et al. | |
| 5,109,161 A | 4/1992 | Horiuchi et al. | |
| 5,196,900 A | 3/1993 | Pettersen | |
| 5,811,827 A | 9/1998 | Pryor et al. | |
| 5,986,745 A | 11/1999 | Hermary et al. | |
| 6,204,755 B1 | 3/2001 | Kikuchi | |
| 6,825,936 B2 | 11/2004 | Metcalfe et al. | |
| 6,876,458 B2 | 4/2005 | Kraus | |
| 7,208,749 B2 | 4/2007 | Drake, Jr. | |
| 2004/0119035 A1 | 6/2004 | Kong et al. | |
| 2004/0128102 A1* | 7/2004 | Petty et al. | 702/150 |
| 2004/0246495 A1 | 12/2004 | Abe | |

* cited by examiner

*Primary Examiner*—Seung C Sohn
(74) *Attorney, Agent, or Firm*—Michael A. Glenn; Glenn Patent Group

(57)    ABSTRACT

Apparatus for optically measuring a remote object comprises at least one source for projecting a plurality of discrete zones of electromagnetic radiation (for example laser spots) along a projection plane. Imaging apparatus images a plurality of reflections from the remote object. By spatially offsetting the imaging apparatus from the projection plane, crosstalk between opposing cameras imaging the same object is more easily avoided. The same effect as spatially offsetting the imager can be achieved by rotating the light source to provide a reflection axis that is not perpendicular to the optical axis.

5 Claims, 5 Drawing Sheets

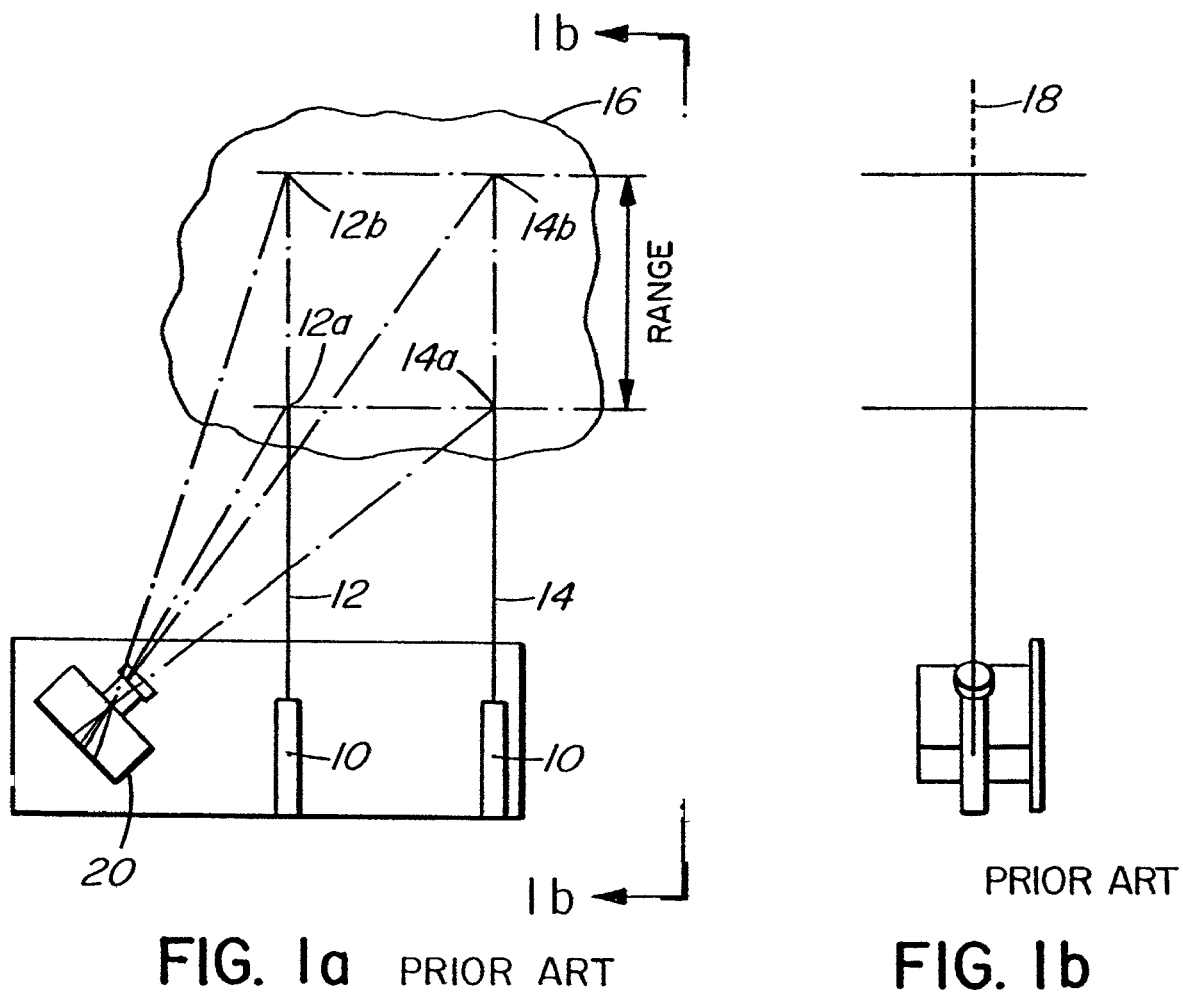
FIG. 1a PRIOR ART
FIG. 1b PRIOR ART
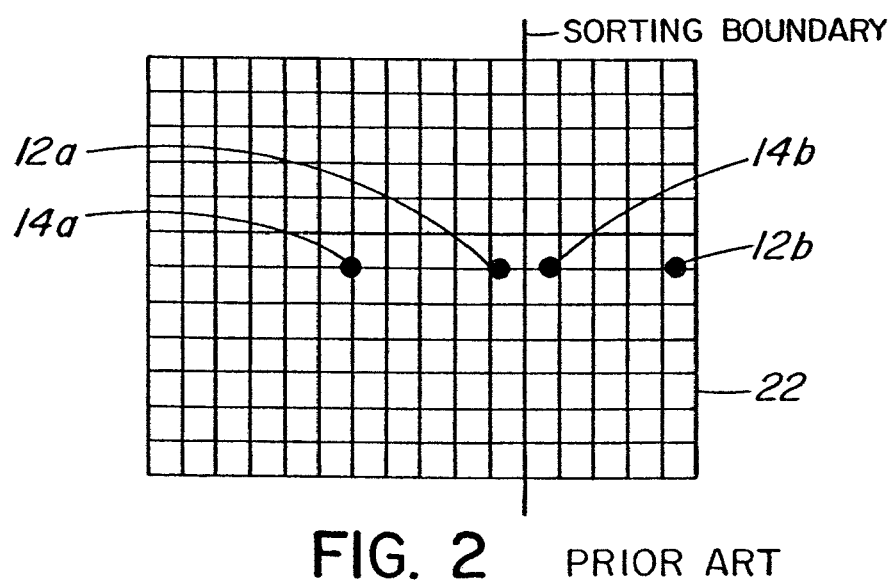
FIG. 2 PRIOR ART

MULTIPLE AXIS MULTIPOINT NON-CONTACT MEASUREMENT SYSTEM

CROSS-REFERENCE TO RELATED APPLICATIONS

This application is a continuation-in-part of U.S. patent application Ser. No. 11/364,488 entitled Multiple Axis Multipoint Non-Contact Measurement System filed 27 Feb. 2006, now U.S. Pat. No. 7,420,196 which claimed priority from Canadian patent application serial no. 2,536,411, all of which are herein incorporated in their entirety by this reference thereto.

FIELD OF THE INVENTION

This invention relates to triangulation-based non-contact measurement. In particular, this invention relates to multipoint triangulation-based non-contact measurement wherein a plurality of light sources are reflected and imaged on an array.

BACKGROUND OF THE INVENTION

In multipoint triangulation-based sensors, a series of aligned spots reflected from a workpiece are imaged by a camera that lies in the same plane as both the spots and the light sources.

The camera typically comprises a two-dimensional pixel array onto which the spots are imaged. The range to each of the spots is derived by triangulation from the location of its image on the array.

As was discussed in U.S. Pat. No. 5,986,745 to Hermary et al., a known limitation of such systems is the difficulty in sorting or discriminating between adjacent spots, for example as a result of the proximity or overlap of imaged spots, or due to dropout of a spot by occlusion from irregular surface characteristics.

One approach to enhancing reliable discrimination between spots is to more accurately determine the centroids of the spots along the triangulation axis. U.S. Pat. No. 5,056,922 to Cielo et al. discloses the use of an elliptical spot (e.g. the shape characteristic of TEM01 mode laser light) wherein the longitudinal axis of the elliptical spot is perpendicular to the longitudinal axis of the detecting elements of a linear array. This allows more accurate determination of the centroid of the spots and hence, better discrimination between adjacent spots.

U.S. Pat. No. 5,986,745 to Hermary et al. addresses the problem by using a spatially encoded pattern of light projected onto a workpiece rather than discrete spots.

U.S. Pat. No. 4,937,445 to Leong teaches the use of a small number of beams, so as to effectively limit the possibility of misidentification of a given spot, while U.S. Pat. No. 4,687,325 to Corby relies on a time-separated series of different patterns of beams.

It is apparent that the problem of spot discrimination in multipoint triangulation sensing systems is well known and that a variety of approaches are used to address it.

An object of the present invention is therefore to provide an improved, elegant and simple means of discriminating between successive spots in a multipoint triangulation-based sensor.

Optical triangulation sensors are often disposed on opposed sides of an object in order to characterize both sides of the object. In such cases, there is a risk of crosstalk between the two sensors when a projected spot is imaged on the opposite sensor enclosure rather than on the surface of the object to be measured. The present invention facilitates the avoidance of such crosstalk.

These and other objects of the invention will be better understood by reference to the detailed description of the preferred embodiment which follows.

SUMMARY OF THE INVENTION

In known prior art multipoint triangulation systems, the camera, the set of projected spots and the light sources are all in the same plane such that single reference-axis triangulation takes place.

According to the invention, the spots are imaged onto a two-dimensional array and the optical and camera set up is selected so as to provide triangulation of the spots effectively about two axes. Preferably one axis is shorter than the other.

The location of successive spots imaged from a workpiece onto the array will vary less along the shorter triangulation axis than along the longer triangulation axis. Appropriate optical parameters for the shorter triangulation can be selected such that even with the maximum expected variation in height of the workpiece, the spots as imaged along the shorter triangulation axis will be constrained to defined, non-overlapping areas of the array. Thus spot discrimination is significantly improved. The longer triangulation axis is used for dimensional measurement while a combination of the shorter and longer triangulation axes is used for spot discrimination.

The inventors have also found that the foregoing can be achieved by spatially offsetting the camera from the plane in which all of the aligned spots lie. This results in range triangulation about the longer axis and spot discrimination about a combination of the longer axis and the axis defined by the spatial offset.

A look-up table may be used to compare the predetermined possible positions of each spot with the actual position of each reflection and thereby correctly associate each reflection with a given projected spot.

In one aspect the invention comprises optical measuring apparatus comprising at least one source for projecting a plurality of discrete zones of electromagnetic radiation along a projection plane and imaging apparatus for imaging a plurality of reflections of said zones from at least one surface extending through said projection plane, said imaging apparatus being spatially offset from said projection plane. In a more particular aspect, the optical measuring apparatus comprises optical triangulation apparatus, the source comprises a laser and the zones of electromagnetic radiation comprise spots of light.

In another aspect, the invention comprises optical measuring apparatus for determining spatial or dimensional characteristics of at least one remote object, comprising a plurality of sources for projecting along a projection plane a plurality of discrete zones of light onto said at least one remote object, imaging apparatus for acquiring an image of a plurality of reflections of said zones of light from said at least one remote object, said imaging apparatus being spatially offset from said projection plane, and a processor for outputting from said imaging apparatus data characterizing said image of said plurality of reflections.

In a further aspect of the invention, there is also provided a record of the possible locations of each reflection in the captured image.

In yet another aspect, the invention comprises a method of optically determining the spatial or dimensional characteristics of at least one remote object, comprising projecting onto said object a plurality of discrete zones of electromagnetic radiation along a projection plane, said projection plane intersecting at least one surface of said object and acquiring an image of a plurality of reflections of said zones from said at least one remote object from a vantage point that is spatially offset from said projection plane.

In a further aspect, the method of the invention comprises predetermining a range of possible locations in said image of each of said plurality of reflections, and associating each one of a plurality of said reflections with one of said zones of electromagnetic radiation by reference to the actual location of each of said reflections in said image and said possible locations of each of said reflections.

In another aspect the invention comprises an optical triangulation sensor having a housing, at least one source in said housing for projection discrete zones of electromagnetic radiation along a projection plane toward an object, imaging apparatus in said housing comprising a two-dimensional array having perpendicular axes, and being disposed such that neither of said axes are normal to said projection plane.

In yet another aspect, the invention comprises the use of at least two optical sensors disposed on opposed sides of a remote object for determining the characteristics of the object. Each sensor comprises at least one source for projecting a plurality of spots of light along a common projection plane toward the object as well as a camera that is spatially offset from the projection plane. The spatial offset provides an angled field of view for the camera that includes the object but does not include the sensor opposite. This simplifies the process of avoiding crosstalk between the sensors that can otherwise result from imaging spots that impinge on the enclosure of the opposite sensor.

In a more particular aspect, the invention comprises a non-contact optical triangulation sensor comprising a housing containing a light source and imaging apparatus. The light source is adapted to project a plurality of aligned discrete zones of electromagnetic radiation onto a workpiece such that the plane that includes the aligned zones that is normal to the workpiece does not include the imaging apparatus.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

The invention will be described by reference to the detailed description of the preferred embodiment and to the drawings thereof in which:

FIG. 1a is a diagram of a typical optical set up according to the prior art;

FIG. 1b is a view along line 1b-1b of FIG. 1a;

FIG. 2 is a diagram of a two-dimensional array imaging the spots from the optical set up of FIGS. 1a and 1b;

DETAILED DESCRIPTION OF THE PREFERRED EMBODIMENT

Figure 3A:
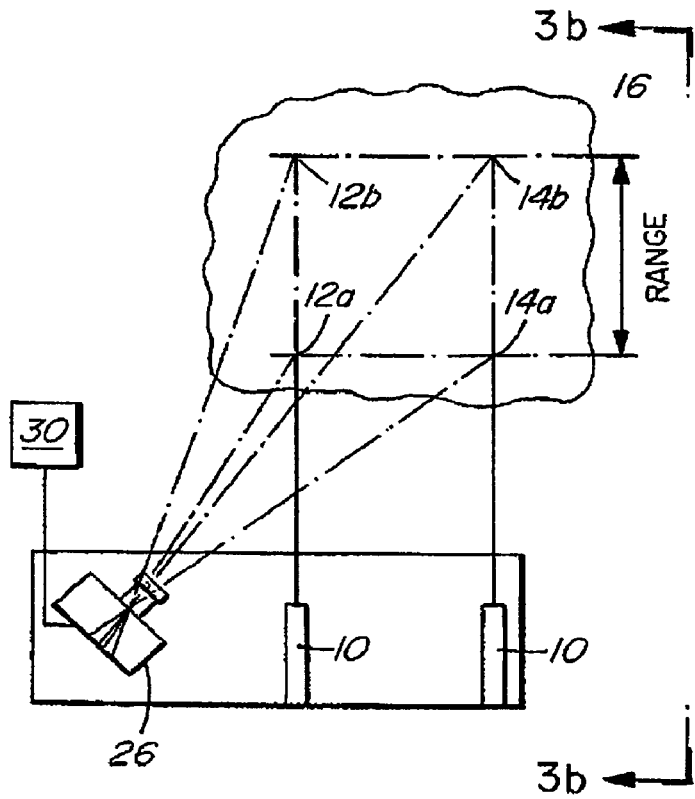
FIG. 3a is an optical set up according to the preferred embodiment of the invention.

FIGS. 1a and 1b illustrate an optical set up according to a conventional prior art approach. A plurality of sources of electromagnetic radiation such a laser light sources 10 are aligned and arranged to project beams of light 12, 14 onto a workpiece (located generally in zone 16) along a common projection plane 18. It will be appreciated that at least one surface of the workpiece intersects the projection plane 18.

Depending on the distance of specific surface points of the workpiece 16 from the light sources 10, beam 12 may be reflected on the workpiece at points 12a (short range) or 12b (longer range) and beam 14 may be reflected at points 14a or 14b.

Camera 20 also lies in plane 18 as will be appreciated by reference to FIG. 1b from which view the laser sources 10 and the camera 20 overlap within the plane 18. Referring to FIG. 2, the reflections of spots 12a or 12b and 14a or 14b are imaged onto a two-dimensional array 22 and the distance between the imaged reflections and the light source is determined by the position of the reflections along the horizontal axis of the array. In the event that the reflections are 12a and 14b, the imaged reflections may be closely adjacent in array 22 or overlap as seen in FIG. 2, thereby inducing difficulties in sorting the reflections and associating them with the correct projected spots.

Figure 3B:
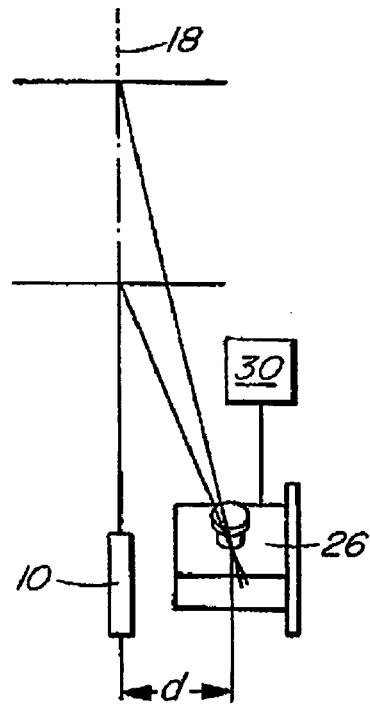
FIG. 3b is a view along line 3b-3b of FIG. 3a showing the offset of the camera from the projection plane.
Figure 4:
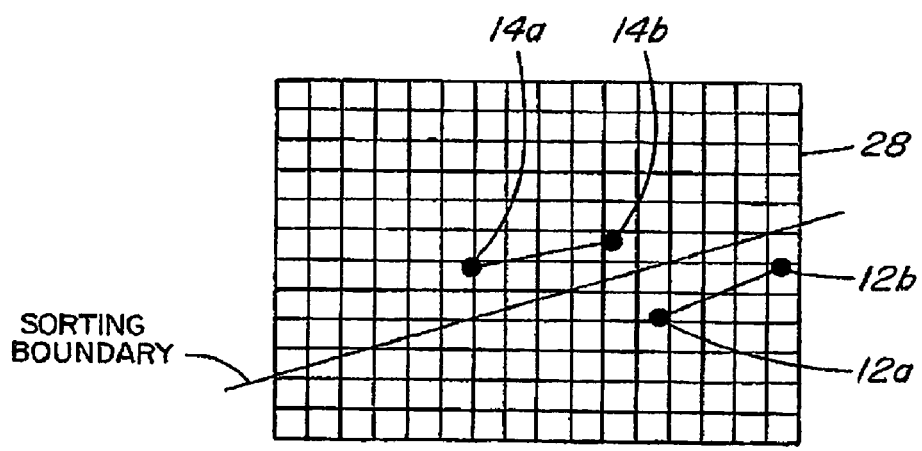
FIG. 4 is a two dimensional array for imaging the spots from the optical set up of the FIGS. 3a and 3b.

According to the preferred embodiment of the invention illustrated in FIGS. 3a and 3b, the optical set up of FIGS. 1a and 1b is modified by spatially offsetting camera 26 from plane 18 by a distance d. As a result of the offset, triangulation is effectively accomplished about two axes, thus resulting in relative displacement of successive reflections imaged on the array 28 along both the horizontal and vertical axes as shown in FIG. 4. Discrimination between, for example, points 12a and 14b by processor 30 therefore becomes significantly easier.

Dual axis triangulation in the preferred optical set up described above results in different behaviour of the reflections on the imaging array than is the case with prior art optical set ups. As the range to the spot on the workpiece varies, the corresponding reflection is displaced across the array in a generally diagonal path rather than along the horizontal axis.

Figure 5:
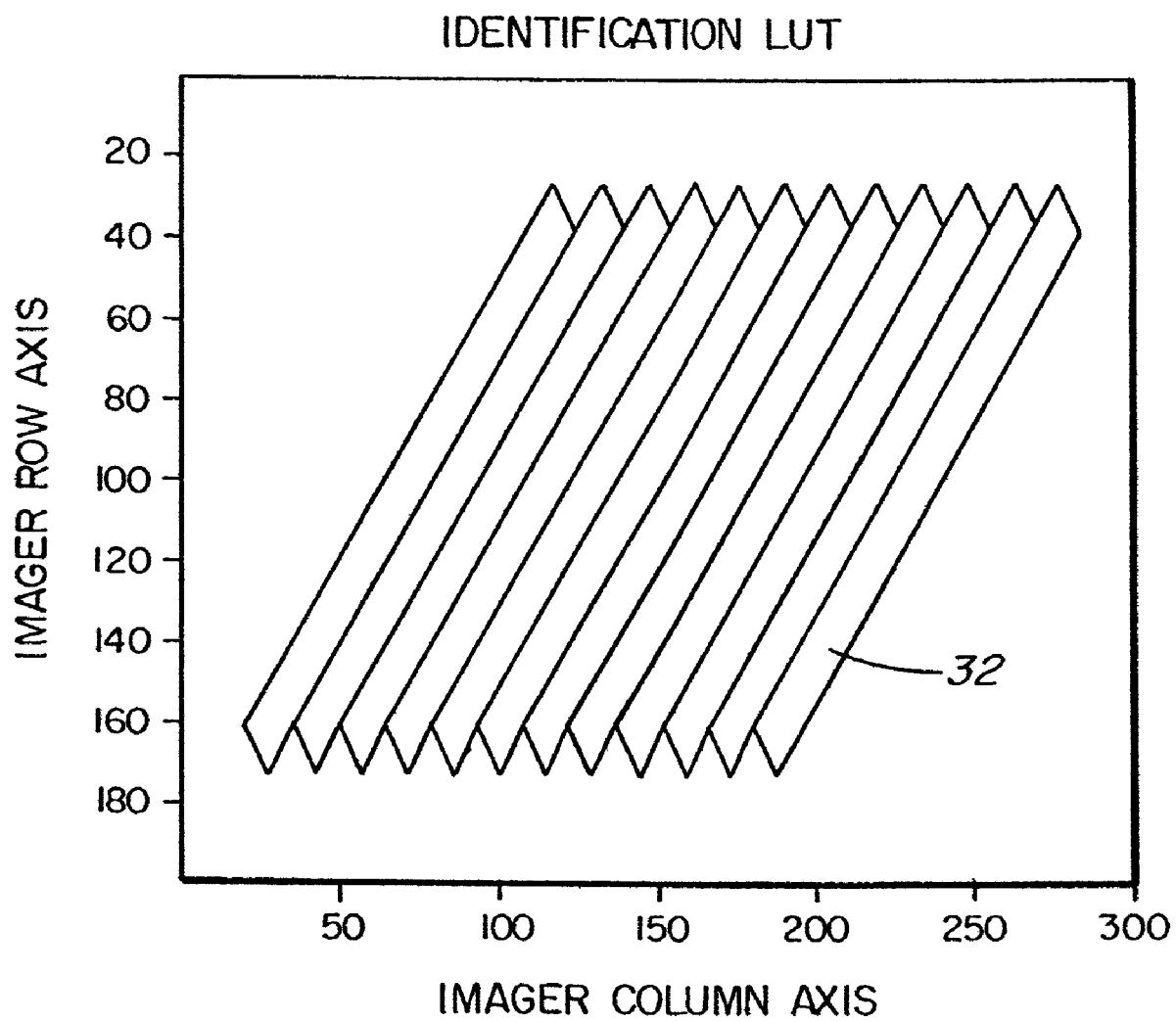
FIG. 5 is an illustration of a lookup table according to the preferred embodiment.

FIG. 5 illustrates the areas of possible locations for each reflected spot as predetermined and recorded in a lookup table. For example, the area defined by parallelepiped 32 represents the possible locations for a given reflected spot on the array. A record of the areas of possible locations for each reflected spot is stored by means of the lookup table. In use, a processor assesses both row and column centroids for each reflection and such centroids are used to determine range and to assign spot identity. The processor may also output data characterizing the image.

In the preferred embodiment shown in FIG. 5, the areas of possible location of the reflections as mapped onto the array are selected to be laterally contiguous. As a result, the identification of a reflection as belonging to one or the other of the areas can be assessed by a probability function. A reflection in the lateral center of an area can be assigned a 100% probability of being associated with that area while the probability can decrease to zero as the location of the reflected spot crosses an area boundary.

The spatial offset of the camera effectively provides a partial side view of the workpiece and of the reflected spots. The greater the offset from the reflection plane, the better the side component of the view and the easier it is to discriminate between spots.

While the preferred embodiment contemplates a plurality of separate light sources projecting along a common light projection plane, this is not essential to the invention. Provided that the light spots reflected from the workpiece all lie substantially in a common reflection plane and that the point of view of the camera is offset from that plane, the invention will enhance discrimination between the spots. The invention is therefore applicable to beam splitting configurations or configurations where the cameras are not necessarily disposed to project light along common planes.

Figure 6:
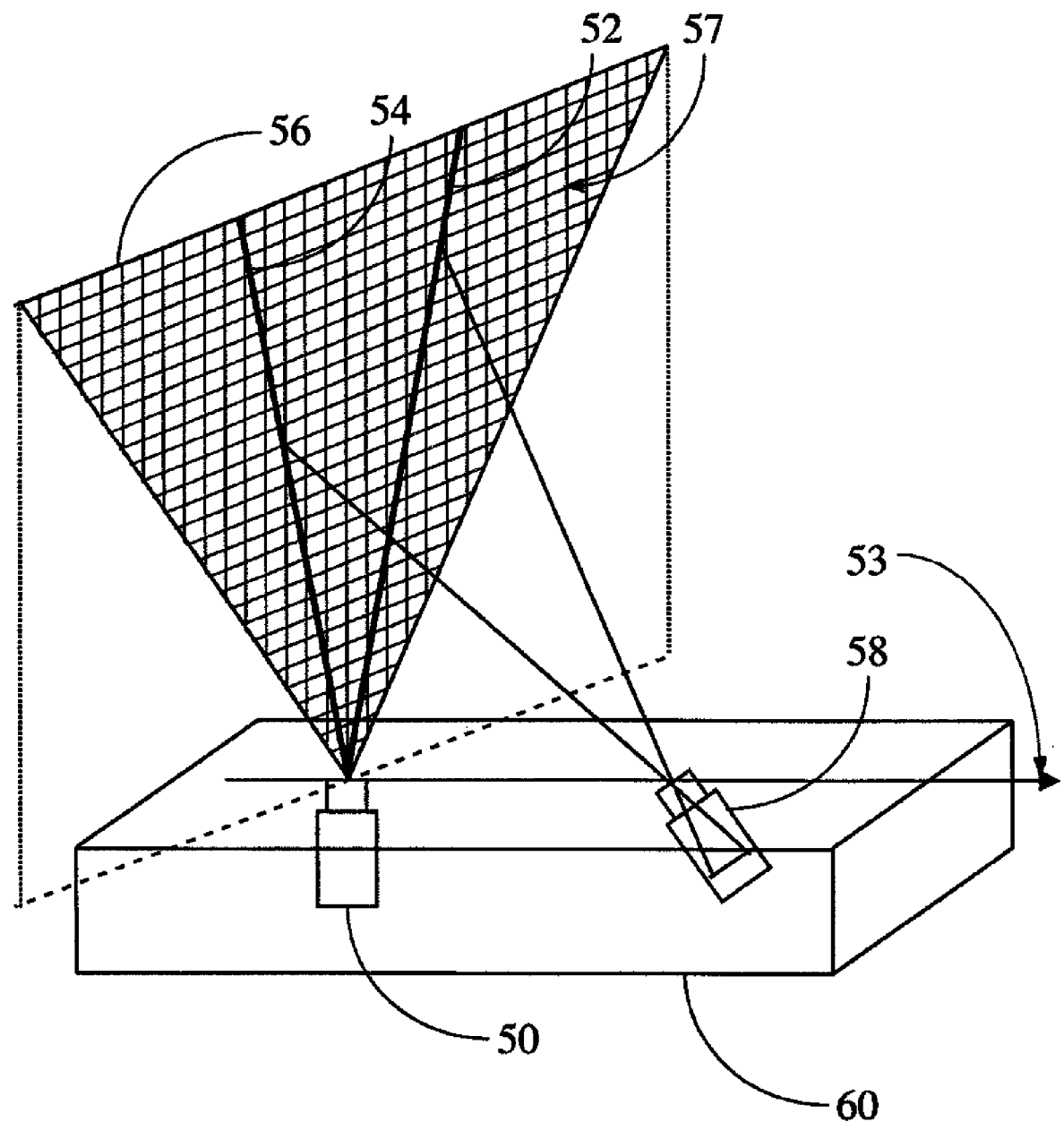
FIG. 6 is an illustration of an optical set up with a skewed reflection axis according to an alternative embodiment of the invention; and, FIG. 7 is a diagram of an optical set up of the crosstalk avoidance embodiment of the invention.

Referring to FIG. 6, in an alternative to the preferred embodiment, a single light source 50 projects a plurality of zones of light 52, 54 (for example using beam splitting or a diffraction grating) such that the zones of light are reflected from the workpiece in nominal alignment along a reflection axis 56. The reflections of the zones of light are assessed for displacement from a nominal position (for example height of the surface from which the zones of light are reflected, i.e. vertical displacement). A measurement plane 57 is defined to include the reflection axis 56 and the possible displaced locations of the reflections. Imaging apparatus 58 (a two-dimensional CCD array camera) is disposed within a sensor enclosure 60 in spaced relation to the light source 50 along a sensor axis 53. The imaging apparatus is arranged such that it does not lie in the measurement plane such that its field of view includes a lateral component.

This optical arrangement can be achieved by providing a light source and imaging apparatus generally along a longitudinal axis 53 of an enclosure or housing 60. The light source is adapted to project a plurality of discrete zones of light for aligned reflection from a nominally flat workpiece. The light source is oriented so that the measurement plane does not include the imaging apparatus, i.e. the reflection axis is skewed in relation to the longitudinal axis of the enclosure, i.e. it is not perpendicular to it. In a typical prior art optical sensor enclosure, the light source and the imaging apparatus are spaced from one another within the enclosure along the longitudinal axis of the enclosure and the light source projects the zones of light along a projection plane that includes the imaging apparatus. In such enclosure, rotating the light source and associated optics within the enclosure to effectively re-orient or skew the reflection axis on the workpiece achieves the object of the invention. It will be appreciated that this arrangement potentially allows for a relatively narrower enclosure than the preferred embodiment as the enclosure need not accommodate a significant lateral offset for the camera.

It is also within the scope of the invention to use more than a single camera. A first camera could be used to provide an image used principally for range determination of the various spots, while a second camera could be offset from the plane in which the spots lie for the purposes of acquiring an image used primarily for spot discrimination. In such case, it would be necessary to associate the data from the second camera with the data from the first camera in order to correlate the identity of the sorted spots to the spots for which range has been determined.

Figure 7:
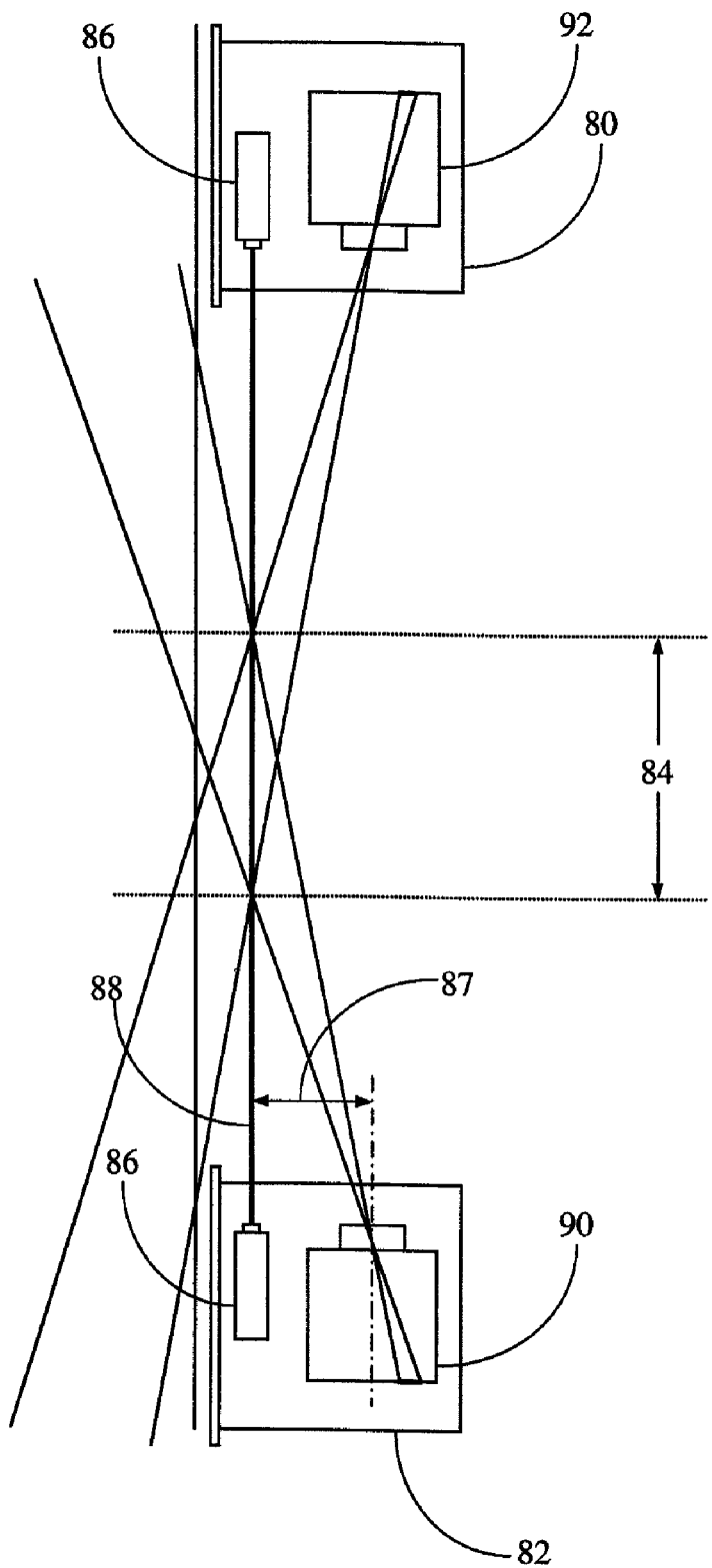

Referring now to FIG. 7, there is shown two optical measuring apparatus, namely optical triangulation sensors 80 and 82, disposed on opposite sides of an object (not shown) to be measured within a range window 84. Each sensor includes at least one source 86 (preferably a laser) for projecting a plurality of discrete zones of electromagnetic radiation along a common projection plane 88. Each sensor also includes imaging apparatus, for example two-dimensional CCD cameras 90 and 92, that is spatially offset from the light source 86. As a result, the field of view of each camera encompasses the range window 84 but does not include the sensor on the opposite side of the object. This serves to avoid crosstalk between the two sensors.

It will be appreciated by those skilled in the art that the preferred and alternative embodiments have been described in some detail but that certain modifications may be practiced without departing from the principles of the invention.

The invention claimed is:

1. A method for optically determining the spatial or dimensional characteristics of at least one remote object, comprising:
   projecting onto said object a plurality of discrete zones of electromagnetic radiation along a single common projection plane from a first side of said object, said projection plane intersecting at least one surface of said object;
   projecting onto said object a plurality of discrete zones of electromagnetic radiation along said projection plane from a side of said object that is opposite to said first side; and,
   acquiring an image of a plurality of reflections of said zones from said at least one remote object from imaging apparatus that is spatially offset from said projection plane.

2. The method of claim 1 further comprising the use of at least two optical triangulation sensors for accomplishing said steps of projecting and acquiring, said sensors being disposed on opposite sides of said object and each of said sensors comprising an enclosure containing means for projecting said discrete zones of electromagnetic radiations and a camera in said enclosure that is spatially offset from said projection means.

3. A system for imaging at least two sides of an object comprising:
   a first housing comprising at least one laser source for projecting a plurality of discrete zones of laser light along a single common projection plane toward said object and a camera spatially offset from said projection plane;
   a second housing comprising at least one laser source for projecting a plurality of discrete zones of laser light along said projection plane toward said object and a camera spatially offset from said projection plane; and,
   said first and second housings being disposed on opposite sides of said object, said projection plane being a common projection plane for each of said laser sources, and said first and second housings being disposed so that their respective laser sources project along said common projection plane.

4. The system of claim 3 wherein each of said cameras comprises a two-dimensional CCD array.

5. Optical triangulation measuring apparatus comprising:
   a housing having an optical axis;
   at least one source disposed along said optical axis within said housing for projecting a plurality of discrete zones of electromagnetic radiation;
   imaging apparatus disposed substantially along said optical axis within said housing for imaging the reflections of said zones from an object; and,
   wherein said source is configured to project said zones along a reflection axis, said reflection axis not being perpendicular to said optical axis.

* * * * *